US008525103B2

(12) United States Patent
Chace et al.

(10) Patent No.: US 8,525,103 B2
(45) Date of Patent: Sep. 3, 2013

(54) METHOD FOR HYDROCARBON SATURATION AND HYDRAULIC FRAC PLACEMENT

(75) Inventors: David M. Chace, Houston, TX (US); Rafay Z. Ansari, Spring, TX (US); Elton Frost, Jr., Spring, TX (US); Feyzi Inanc, Spring, TX (US); W. Allen Gilchrist, Jr., Fort Davis, TX (US); Randy L. Evans, Sugar Land, TX (US)

(73) Assignee: Baker Hughes Incorporated, Houston, TX (US)

( * ) Notice: Subject to any disclaimer, the term of this patent is extended or adjusted under 35 U.S.C. 154(b) by 293 days.

(21) Appl. No.: 13/033,775

(22) Filed: Feb. 24, 2011

(65) Prior Publication Data

US 2012/0091329 A1 Apr. 19, 2012

Related U.S. Application Data

(60) Provisional application No. 61/307,924, filed on Feb. 25, 2010.

(51) Int. Cl.
*G01V 5/10* (2006.01)

(52) U.S. Cl.
USPC ...................................... 250/269.7

(58) Field of Classification Search
USPC ...................................... 250/269.7
See application file for complete search history.

(56) References Cited

U.S. PATENT DOCUMENTS

| | | | |
|---|---|---|---|
| 4,317,993 A | 3/1982 | Hertzog, Jr. et al. | |
| 4,379,228 A | 4/1983 | Allen | |
| 4,580,050 A | 4/1986 | Paap | |
| 4,722,220 A | 2/1988 | Herron | |
| 4,950,892 A | 8/1990 | Olesen | |
| 5,528,030 A | 6/1996 | Mickael | |
| 7,142,985 B2 | 11/2006 | Edwards | |
| 7,186,971 B2 | 3/2007 | Riley et al. | |
| 7,205,535 B2 | 4/2007 | Madigan et al. | |
| 7,554,081 B2 | 6/2009 | Riley et al. | |

FOREIGN PATENT DOCUMENTS

EP 457628 11/1991

OTHER PUBLICATIONS

Notification of Transmittal of the International Search Report and the Written Opinion of the International Searching Authority, or the Declaration; PCT/US2011/026052; Sep. 29, 2011.
Steingrimsson, Benedikt. "Geothermal Well Logging: Geological Wireline Logs and Fracture Imaging," Presented at "Short Course on Geothermal Drilling, Resource Development and Power Plants," organized by UNU-GTP and LaGeo, in Santa Tecla, El Salvador, Jan. 16-22, 2011.

*Primary Examiner* — David Porta
*Assistant Examiner* — Hugh H Maupin
(74) *Attorney, Agent, or Firm* — Cantor Colburn LLP

(57) ABSTRACT

A method for estimating a property of an earth formation, the method includes: conveying a carrier through a borehole penetrating the earth formation; irradiating the formation with neutrons from a neutron source disposed at the carrier; detecting a first signal from the formation due to the irradiating using a first radiation detector, the first signal being related to a saturation of a fluid in the formation; detecting a second signal from an element in the formation due to the irradiating using a second radiation detector, the second signal being related to an element emitting the second signal in the formation; and estimating the property from the first signal and the second signal.

22 Claims, 3 Drawing Sheets

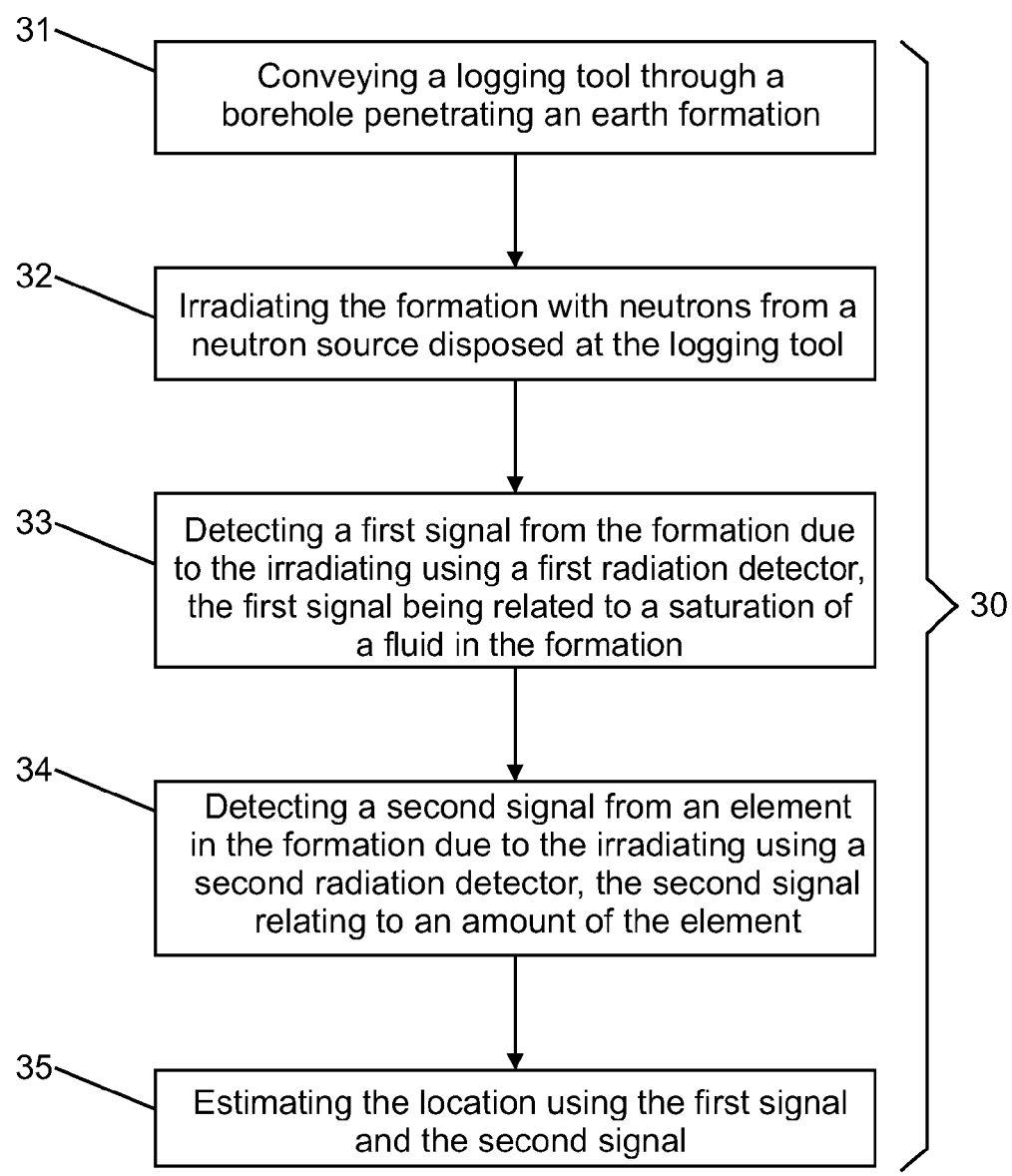

METHOD FOR HYDROCARBON SATURATION AND HYDRAULIC FRAC PLACEMENT

BACKGROUND OF THE INVENTION

1. Field of the Invention

The present invention relates to production of hydrocarbons and, in particular, to estimating properties of formations related to production of the hydrocarbons.

2. Description of the Related Art

Production of hydrocarbons from within the earth generally requires providing a pathway from an earth formation containing the hydrocarbons to a borehole drilled in the earth formation. From the borehole, the hydrocarbons are extracted to the surface of the earth.

One process used to create the pathway is referred to as "fracturing." The fracturing process fractures or cracks rock in the earth formation that may contain reservoirs of the hydrocarbons. The fractures are used to connect hydrocarbon-containing pores in the rock and, thus, can increase the production of hydrocarbons.

In one example of fracturing, hydraulic pressure is exerted in an interval of a reservoir rock. When the hydraulic pressure meets or exceeds the formation fracture pressure, the rock will fracture. The resulting fracture will increase the fluid conductivity between the pores of the rock Boreholes through earth formations can be very deep traversing different types of litho logical facies. Some of the facies are more conducive to fracture with the potential for large hydrocarbon production while others are not. Hence, it can be challenging trying to determine the best places in an earth formation to fracture rock while not wasting resources on places with little potential for hydrocarbon production.

Therefore, what are needed are techniques for determining where to fracture a formation for the production of hydrocarbons.

BRIEF SUMMARY OF THE INVENTION

Disclosed is an example of a method for estimating a property of an earth formation, the method includes: conveying a carrier through a borehole penetrating the earth formation; irradiating the formation with neutrons from a neutron source disposed at the carrier; detecting a first signal from the formation due to the irradiating using a first radiation detector, the first signal being related to a saturation of a fluid in the formation; detecting a second signal from an element in the formation due to the irradiating using a second radiation detector, the second signal being related to an element emitting the second signal in the formation; and estimating the property from the first signal and the second signal.

Also disclosed is an apparatus for estimating a property of an earth formation, the apparatus includes: a carrier configured to be conveyed through a borehole penetrating the earth formation; a neutron source disposed at the carrier and configured to irradiate the formation with neutrons; a first detector configured to detect a first signal from the formation due to the irradiating, the first signal being related to a saturation of fluids in the formation; a second detector configured to detect a second signal from the formation due to the irradiating, the second signal being related to an element emitting the second signal in the formation; wherein the first signal and the second signal are used to estimate the location.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

FIG. 3 presents one example of a method for estimating a location in earth formation.

DETAILED DESCRIPTION OF THE INVENTION

Disclosed are exemplary embodiments of techniques for efficiently estimating where to fracture an earth formation for the production of hydrocarbons. In particular, the techniques estimate the more desirable locations that have potential for increased hydrocarbon production. Efficiency of data gathering is increased by using a logging tool that can log the necessary data in one logging pass through a cased borehole penetrating the earth formation.

The techniques, which include method and apparatus, call for using a pulsed neutron logging instrument to acquire during the same logging pass saturation measurements of oil, water, and/or gas, measurements of a selected element through neutron activation, and/or prediction of openhole log data response using an emulation technique (e.g., neural net, multidimensional histogram analysis, etc.). By determining a location of the earth formation having a relatively high hydrocarbon saturation and an element indicative of being able to efficiently extract the hydrocarbon, resources can be dedicated to fracturing that location to extract the hydrocarbons with an increased probability of success. Using gas shale plays as an example, the pulsed neutron logging tool can measure accumulated gas saturation along the borehole in addition to measuring silicon or silica content. Activation of silicon by a neutron pulse produces count rates of gamma rays that are linearly proportional to the weight fraction of the silicon, and therefore can be used to identify zones of highest silica content. Shale play intervals with higher concentrations of silica are generally more conducive to hydraulic fracturing (in terms of effective fracture length). Thus, by comparing the gas saturation measurements with the elemental activation measurements, formation zones more desirable for fracturing can be determined. For example, in one embodiment, the more desirable reservoirs interval or layers for fracturing are those intervals with high gas saturation and high silica content.

In one embodiment, the location can be identified where minimum threshold levels of hydrocarbon saturation and yield of the selected element are exceeded. In another embodiment, the location can be identified by determining where relative maxima of hydrocarbon saturation and the selected element occur.

Figure 1:
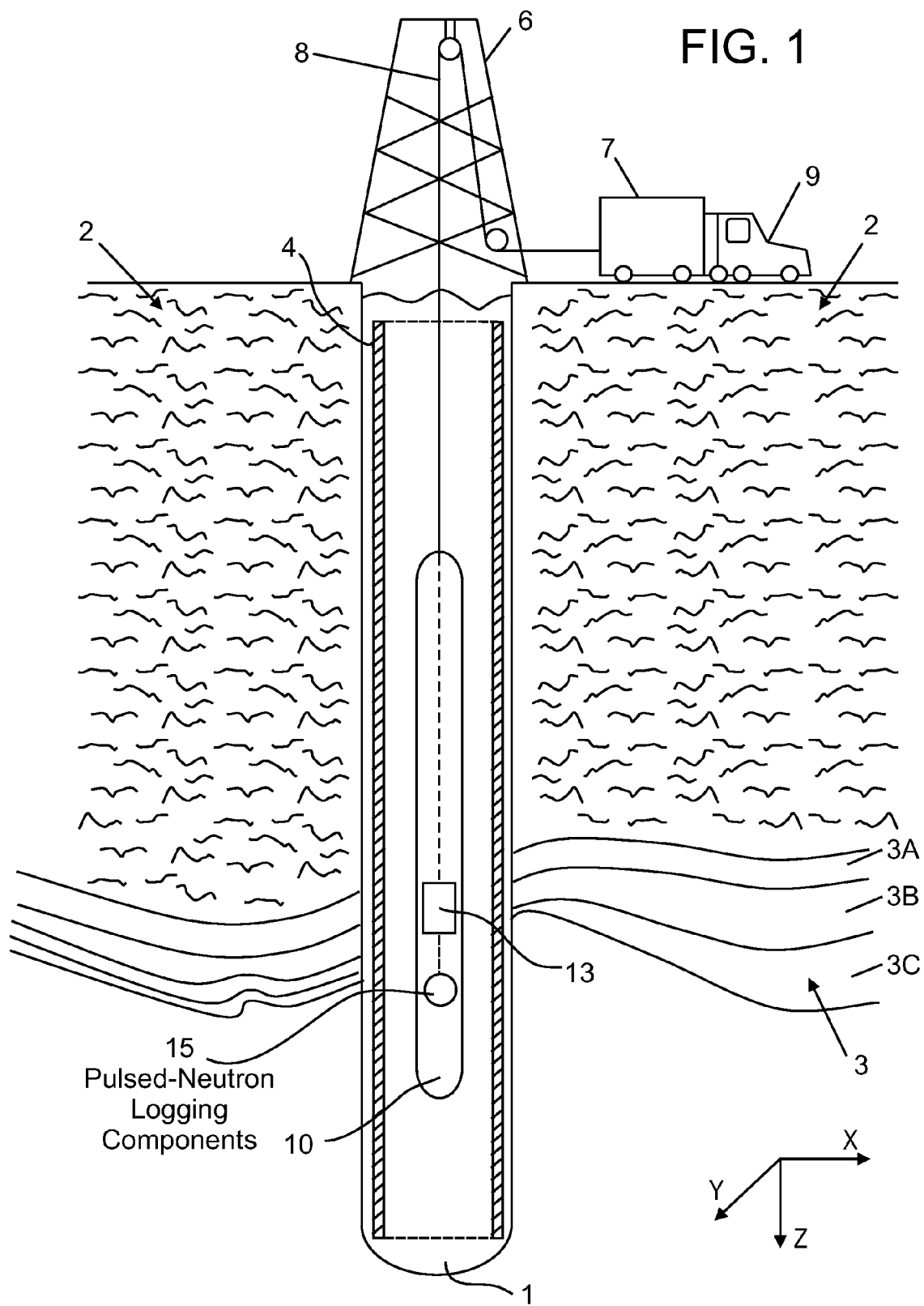
FIG. 1 illustrates an exemplary embodiment of a logging tool disposed in a borehole penetrating an earth formation.

Apparatus for implementing the techniques disclosed herein is now discussed. Reference may now be had to FIG. 1. FIG. 1 illustrates an exemplary embodiment of a well logging instrument 10 (also referred to as a "tool") for wireline logging shown disposed in a wellbore 1 (also referred to as a borehole). The wellbore 1 generally traverses a formation 3 that can include various intervals or layers shown as 3A, 3B and 3C. One skilled in the art will recognize that the various geological features as may be encountered in a subsurface environment may be referred to as "formations." As used herein the term "formation" also includes the subsurface materials that makeup the formation. For example, the formation can include a rock matrix of pores filled with one or more fluids such as water, oil or gas and the like. As a matter of convention, a depth of the wellbore 1 is described along a Z-axis, while a cross-section is provided on a plane described by an X-axis and a Y-axis. Prior to well logging with the logging instrument 10, the wellbore 1 is drilled into the Earth 2 using a drilling rig.

The logging instrument 10 is lowered into the wellbore 1 using a wireline 8 deployed by a derrick 6 or similar equipment. Generally, the wireline 8 includes suspension apparatus, such as a load bearing cable, as well as other apparatus. The other apparatus may include a power supply, a communications link (such as wired or optical) and other such equipment. Generally, the wireline 8 is conveyed from a service truck 9 or other similar apparatus (such as a service station, a base station, etc. . . . ). Often, the wireline 8 is coupled to topside equipment 7. The topside equipment 7 may provide power to the logging instrument 10, as well as provide computing and processing capabilities for at least one of control of operations and analysis of data.

The wellbore 1 as shown in FIG. 1 is lined with a casing 4 to preserve the integrity of the wellbore 1. Non-limiting embodiments of materials for the casing 4 include metals such as steel, concrete, cement, or any combination thereof. In completing the well, it is advantageous to install the casing 4 quickly after the wellbore 1 is drilled before damage can occur. Thus, time may not be available to perform open well logging (i.e., without a casing). Therefore, the logging tool 10 includes pulse-neutron logging components 15 for logging through the casing 4. The pulse-neutron logging components 15 may communicate with downhole electronics 13 and/or the topside equipment 7.

Figure 2:
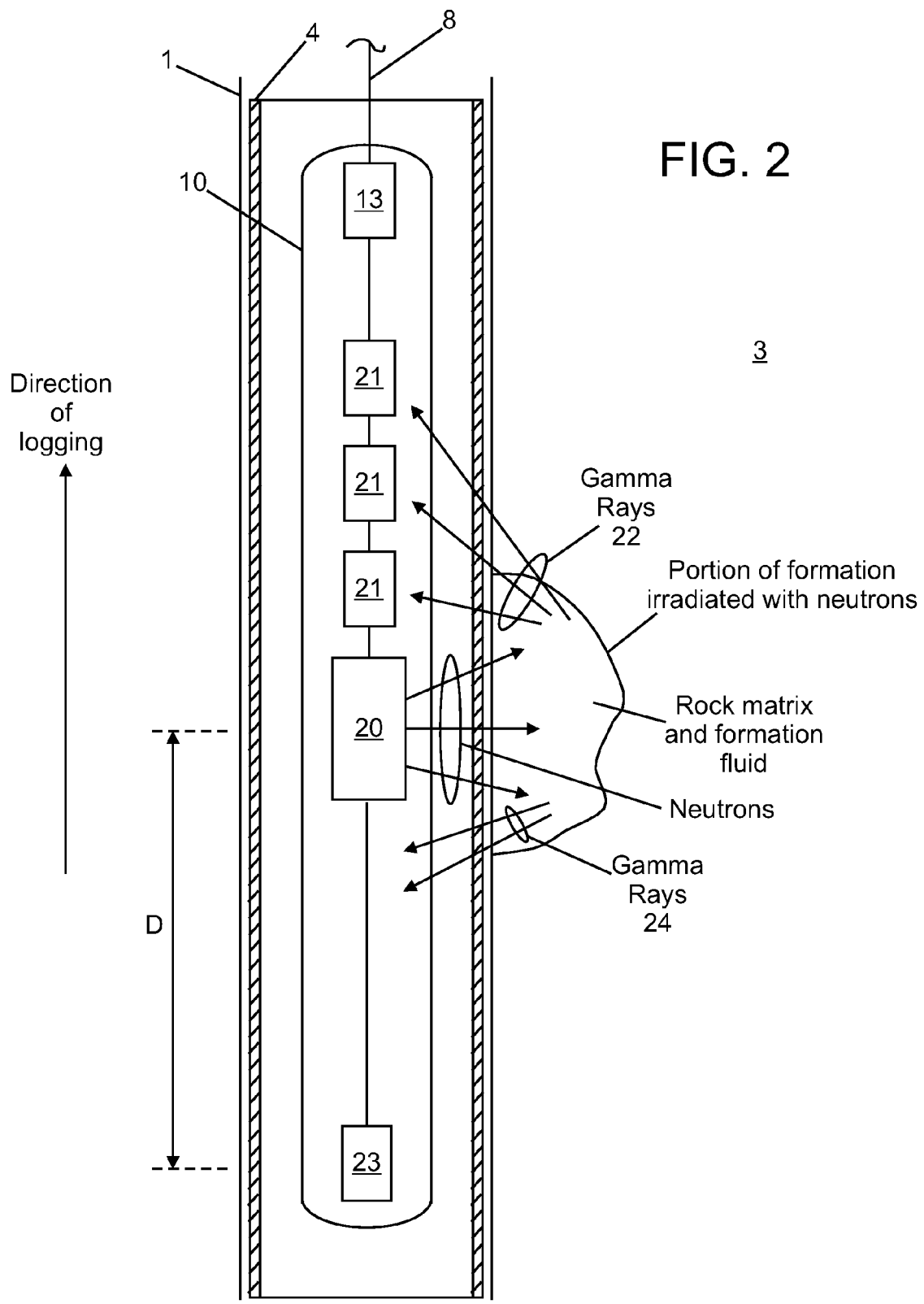
FIG. 2 depicts aspects of the logging tool.

Reference may now be had to FIG. 2, which illustrates an exemplary embodiment of the pulse-neutron logging components 15 in the logging tool 10. The components 15 include a neutron generator 20 configured to irradiate the formation 3 with neutrons. The neutron generator 20 is located about mid-tool illustrative purposes. Disposed above the neutron generator 20 are one or more first radiation detectors 21, each spaced a specific distance from the neutron generator 20. The first radiation detectors 21 are configured to detect (i.e., measure) first signals 22 due to the irradiation of the formation 3 by the neutrons. In general, the first signals 22 include gamma rays emitted from the formation 3 by processes that include inelastic scattering and thermal neutron capture.

The first signals 22 provide enough information from which a saturation of a fluid in the formation 3 can be estimated. For example, in one embodiment, saturation can be derived from a ratio of carbon to oxygen. The amount of carbon and oxygen (or the elemental yields of C and O) can be determined from a spectrum analysis of the first signals 22 knowing how carbon and oxygen uniquely respond to neutron radiation. Higher ratios of C to O can indicate oil-bearing formations while lower ratios can indicate water-bearing formations. Alternatively or in addition to the C to O ratio, the thermal neutron capture cross-section (sigma) may be used to estimate saturation. Sigma is a measure of the rate at which thermal neutrons are captured. Predominately, the thermal neutrons are captured by chlorine. Thus, sigma provides a measure of the chlorine content or salinity of the formation. A high value of sigma indicates saline water while a low value of sigma indicates fresh water and/or hydrocarbons. Alternatively, or in addition to the aforementioned saturation measurement techniques, gas saturation can be determined based on the ratio of inelastic-scattering gamma ray count rates measured at detectors placed at different distances from the neutron generator 20. Gas saturation can also be determined based on the ratio of thermal neutron capture gamma ray count rates measured at detectors placed at different distances from the neutron generator 20. The thermal neutron capture gamma ray count rate ratio can also be used in some cases to determine oil saturation.

Still referring to FIG. 2, a second radiation detector 23 is disposed below the neutron generator 20 a distance D. The second radiation detector 23 is configured to detect (i.e., measure) second signals 24 due to the irradiation of the formation 3 by the neutrons. As with the first signals 22, the second signals 24 include gamma rays emitted from the formation 3 by processes that include inelastic scattering and thermal neutron capture. The gamma rays in the second signals 24 provide a spectrum of energies that can be related to the elemental yields of various elements in the formation 3.

The logging tool 10 in FIG. 2 is configured for logging while being conveyed from a downhole location towards the surface of the earth (i.e., uphole). With this configuration, the neutron generator 20 can irradiate a portion of the formation 3 as the neutron generator 20 passes by. Due to the distance D, it will take a time T before the second detector arrives at the irradiated portion and receives the second signal 24 where T=D/S, S being the speed of conveyance of the logging tool 10 through the borehole 1. Depending on the half-life of the elements activated by the neutron radiation, the second signals 24 may be emitted by some of the activated elements either before or after the second radiation detector 23 passes the irradiated portion of the formation 3. Hence, with the appropriate selection of distance D and speed S, certain elements can be limited or excluded from detection. For example, the half-lives of activated oxygen (in water), silicon (Si), and iron (Fe) are approximately 7 seconds, 2.3 minutes, and on the order of hours, respectively. If the distance D is approximately ten feet and the logging speed is ten feet per minute, then the second radiation detector 23 will pass the irradiated portion of the formation 3 in about one minute and will thus be able to detect the second signals 24 emitted by silicon. The second radiation detector 23 will not detect the second signals 24 emitted from oxygen because over six half-lives will have expired and effectively all of the activated oxygen will have decayed in the one minute it takes for the logging tool 10 to traverse the distance D. Because of the long half-life of iron, will emit relatively little gamma radiation.

While the logging tool 10 shown in FIG. 2 is configured for logging in an uphole direction, the tool 10 can have an opposite configuration for logging in the downhole direction. The logging tool 10 can also be configured with two sets of first detectors 21 and second detector 23 for logging in either direction.

Reference may now be had to FIG. 3 illustrating one example of a method 30 for estimating a location in an earth formation. The method 30 calls for (step 31) conveying the logging tool 10 through the borehole 1 penetrating the earth formation 3. The borehole 1 may be lined with the casing 4. Further, the method 30 calls for (step 32) irradiating the formation 3 with neutrons generated by the neutron generator 20 disposed at the logging tool 10. Further, the method 30 calls for (step 33) detecting the first signal 22 from the formation 3 due to the irradiating using a first radiation detector 21, the first signal 22 being related to a saturation of a fluid in the formation 3. Further, the method 30 calls for (step 34) detecting the second signal 24 from a selected element in the formation 3 due to the irradiating using the second radiation detector 23. Further, the method 30 calls for (step 35) estimating the location using the first signal and the second signal.

Once the first signals 22 and the second signals 24 are obtained, measured parameters associated with these signals can be displayed or plotted together in an overlay or a cross-plot. For example, comparison of sigma obtained from the first signals 22 and silicon elemental yield can be accomplished using the overlay or the cross-plot to determine the lithology of the formation 3 through the casing 4.

The logging tool 10 and associated method provide advantages over prior art logging tools. One advantage is that logging tool 10 can be used in a cased borehole 1 and, thus, the borehole 1 can be cased quickly before damage can occur to it. Another advantage is that the data obtained with the logging tool 10 from the cased borehole 1 can be used to emulate data that would be obtained from an open or uncased borehole 1. Hence, there is little need to delay completion of the borehole 1 in order to perform openhole logging. Still another advantage is the ability to gather the data required to estimate the location in one pass through the borehole 1. Still another advantage is the ability to exclude or limit receiving unwanted second signals 24 by selecting an appropriate distance D and logging speed S.

In support of the teachings herein, various analysis components may be used, including a digital and/or analog system. For example, the topside equipment 7 or the downhole electronics 13 can include the digital and/or analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. The logging tool 10 is one non-limiting example of a carrier. Other exemplary non-limiting carriers include drill strings of the coiled tube type, of the jointed pipe type and any combination or portion thereof. Other carrier examples include casing pipes, wirelines, wireline sondes, slickline sondes, drop shots, bottomhole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for estimating a location for fracturing an interval in an earth formation, the method comprising:
   conveying a carrier through a borehole penetrating the earth formation;
   irradiating the formation with neutrons from a neutron source disposed at the carrier;
   detecting a first signal from the formation due to the irradiating using a first radiation detector, the first signal being related to a saturation of fluids in the formation;
   detecting a second signal from the formation due to the irradiating using a second radiation detector, the second signal being related to an element emitting the second signal in the formation; and
   estimating the location for fracturing the interval in the earth formation using the first signal and the second signal.

2. The method of claim 1, wherein the second signal is further related to an amount of the element or a mineralogy comprising the element or a combination thereof.

3. The method of claim 1, wherein the irradiating, the detecting a first signal, and the detecting a second signal are performed in one pass of the carrier through the borehole.

4. The method of claim 1, wherein the neutrons, the first signal, and the second signal comprise sufficient energy to traverse a casing lining the borehole.

5. The method of claim 1, wherein the interval corresponds to a saturation of a hydrocarbon that exceeds a threshold level as measured by the first signal.

6. The method of claim 5, wherein the hydrocarbon is gas in a shale play.

7. The method of claim 1, wherein the interval corresponds to a relative maximum of a saturation of a hydrocarbon as measured by the first signal.

8. The method of claim 7, wherein the interval further corresponds to a relative maximum of silica as measured by the second signal.

9. The method of claim 1, wherein the first signal and the second signal are presented together on one plot.

10. The method of claim 1, wherein the neutrons are fast neutrons, the first signal comprises first gamma rays having a characteristic related to the saturation, and the second signal comprises second gamma rays having a characteristic related to the element in the formation.

11. The method of claim 1, wherein the second radiation detector is spaced a distance D from the neutron source and the carrier is conveyed at a speed S such that time D/S is less than a half-life of the element emitting the second signal due to being irradiated by the neutron source and greater than about six half-lives of another element activated by the irradiation.

12. The method of claim 1, wherein the first signal comprises gamma rays emitted due to inelastic scattering of the neutrons or thermal capture of the neutrons or combination thereof.

13. The method of claim 12, wherein the first signal is related to the saturation by way of a mathematical parameter comprising (a) a ratio of gamma rays due to inelastic scattering detected by one first detector spaced a first distance from the neutron generator to gamma rays due to inelastic scattering detected by another first detector spaced a second distance from the neutron generator or (b) a ratio of gamma rays due to thermal neutron capture detected by the one first detector to gamma rays due to thermal neutron capture detected by the another first detector or (c) a combination thereof.

14. An apparatus for estimating a location for fracturing an interval in an earth formation, the apparatus comprising:
 a carrier configured to be conveyed through a borehole penetrating the earth formation;
 a neutron source disposed at the carrier and configured to irradiate the formation with neutrons;
 a first detector configured to detect a first signal from the formation due to the irradiating, the first signal being related to a saturation of fluids in the formation;
 a second detector configured to detect a second signal from the formation due to the irradiating, the second signal being related to an element emitting the second signal in the formation;
 wherein the first signal and the second signal are used to estimate the location for fracturing the interval in the earth formation.

15. The apparatus of claim 14, wherein the borehole is lined with a casing and the neutron source is configured to emit neutrons with sufficient energy to traverse the casing.

16. The apparatus of claim 14, wherein the second detector is spaced a distance D from the neutron source and the carrier is configured to be conveyed at a speed S such that time D/S is less than a half-life of the element emitting the second signal due to being irradiated by the neutron source and greater than about six half-lives of another element activated by the irradiation.

17. The apparatus of claim 16, wherein the time is substantially greater than the half-life of a selected element such that the selected element is excluded from detection.

18. The apparatus of claim 14, further comprising a processor configured to receive the first signal and the second signal and present the first signal and the second signal on one plot.

19. The apparatus of claim 14, wherein the property is a location and the apparatus further comprises a processor configured to estimate the location by determining where the location exceeds a threshold level of hydrocarbon saturation and a threshold level of a selected element.

20. The apparatus of claim 19, wherein the hydrocarbon is a gas in a shale play and the element is silicon.

21. The apparatus of claim 14, wherein the first detector comprises at least two detectors and the first and second detectors are configured to detect gamma rays.

22. The apparatus of claim 14, wherein the carrier is conveyed by a wireline.

\* \* \* \* \*